United States Patent
Kamiki et al.

(10) Patent No.: US 10,323,940 B2
(45) Date of Patent: Jun. 18, 2019

(54) TILT ANGLE MEASURING DEVICE

(71) Applicant: TOPCON Corporation, Tokyo-to (JP)

(72) Inventors: Masaki Kamiki, Tokyo-to (JP); Goro Iwasaki, Tokyo-to (JP); Shinji Yamaguchi, Tokyo-to (JP); Satoshi Yanobe, Tokyo-to (JP); Eiji Takeuchi, Tokyo-to (JP); Yosuke Okudaira, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 220 days.

(21) Appl. No.: 15/296,317

(22) Filed: Oct. 18, 2016

(65) Prior Publication Data
US 2017/0108333 A1 Apr. 20, 2017

(30) Foreign Application Priority Data
Oct. 20, 2015 (JP) .................... 2015-206029

(51) Int. Cl.
*G01C 9/20* (2006.01)
*G01C 9/06* (2006.01)
(52) U.S. Cl.
CPC .............. *G01C 9/20* (2013.01); *G01C 9/06* (2013.01); *G01C 2009/066* (2013.01)
(58) Field of Classification Search
CPC .................................. G01C 9/06; G01C 9/20
USPC .................... 33/348.2, 366.23, 377
See application file for complete search history.

(56) References Cited

U.S. PATENT DOCUMENTS

| 4,110,609 | A | * | 8/1978 | Beer | G01C 9/06 250/231.1 |
| 4,484,393 | A | * | 11/1984 | LaFreniere | G01C 9/32 33/348.2 |
| 5,780,848 | A | * | 7/1998 | Thompson | G01C 9/20 250/231.13 |
| 2002/0189116 | A1 | * | 12/2002 | Yang | G01C 9/32 33/366.23 |
| 2007/0169362 | A1 | * | 7/2007 | Perchak | G01C 9/06 33/366.16 |

(Continued)

FOREIGN PATENT DOCUMENTS

EP 1772703 A2 4/2007
EP 2476998 A2 7/2012

(Continued)

OTHER PUBLICATIONS

European communication dated Feb. 8, 2017 in corresponding European patent application No. 16194802.1.

(Continued)

*Primary Examiner* — G. Bradley Bennett
(74) *Attorney, Agent, or Firm* — Nields, Lemack & Frame, LLC

(57) ABSTRACT

The invention provides a tilt angle measuring device, which comprises a discoid container for including a liquid forming a free liquid surface, a light emitting source for allowing a detection light to enter the free liquid surface, a photodetector for receiving the detection light reflected on the free liquid surface and a signal processing unit for detecting a tilt of the free liquid surface based on a detection signal from the photodetector, wherein the signal processing unit sets a detection light storage time of the photodetector so that an error incidence rate of the detection signal is a predetermined value.

7 Claims, 8 Drawing Sheets

(56) References Cited

U.S. PATENT DOCUMENTS

| | | | |
|---|---|---|---|
| 2008/0172894 A1* | 7/2008 | Chang | G01C 9/06 33/366.16 |
| 2010/0064534 A1 | 3/2010 | Schumacher et al. | |
| 2010/0195094 A1 | 8/2010 | Glimm | |
| 2011/0131824 A1 | 6/2011 | Yanobe et al. | |
| 2012/0180564 A1 | 7/2012 | Ohtomo et al. | |
| 2012/0216413 A1 | 8/2012 | Adegawa | |
| 2014/0259712 A1* | 9/2014 | Takahashi | G01C 9/18 33/377 |
| 2015/0092187 A1* | 4/2015 | Yamanoi | G01J 1/0266 356/72 |
| 2016/0103001 A1 | 4/2016 | Yanobe et al. | |
| 2016/0290800 A1 | 10/2016 | Momiyama et al. | |
| 2017/0108334 A1 | 4/2017 | Kamiki et al. | |
| 2017/0160108 A1 | 6/2017 | Yanobe | |
| 2017/0309806 A1 | 10/2017 | Kumagai et al. | |
| 2018/0137650 A1 | 5/2018 | Yanobe et al. | |

FOREIGN PATENT DOCUMENTS

| | | |
|---|---|---|
| JP | 5-38521 U | 5/1993 |
| JP | 2000-266545 A | 9/2000 |
| JP | 2001-221635 A | 8/2001 |
| JP | 2011-149854 A | 8/2011 |

OTHER PUBLICATIONS

European communication dated Mar. 23, 2017 in co-pending European patent application No. 16194797.3.

Notice of allowance dated Jul. 20, 2018 in co-pending U.S. Appl. No. 15/,296,328.

Notice of allowance dated Sep. 12, 2018 in co-pending U.S. Appl. No. 15/296,328.

* cited by examiner

FIG.11

FIRST EXAMPLE

| STORAGE TIME[ms] | 2 | 4 | 21 | 42 | 62 |
|---|---|---|---|---|---|
| ERROR RATE[%] | 6 | 7 | 16 | 25 | 29 |

SECOND EXAMPLE

| STORAGE TIME[ms] | 2 | 4 | 21 | 42 | 62 |
|---|---|---|---|---|---|
| ERROR RATE[%] | 3 | 4 | 14 | 24 | 30 |

THIRD EXAMPLE
CONVENTIONAL TILT SENSOR

| STORAGE TIME[ms] | 30 |
|---|---|
| ERROR RATE[%] | 27 |

TILT ANGLE MEASURING DEVICE

BACKGROUND OF THE INVENTION

The present invention relates to a tilt angle measuring device which measures a tilt angle of a device main body.

As one of the tilt angle measuring devices, there is a tilt angle measuring device which uses the fact that a free liquid surface maintains a horizontality. Further, as the tilt angle measuring device which uses the free liquid surface, there is, e.g., a tilt sensor.

As regards the tilt sensor, when a device main body, on which the tilt sensor is provided, tilts, the free liquid surface relatively tilts with respect to the device main body.

By entering of a detection light on the free liquid surface, receiving the detection light as reflected on the free liquid surface and detecting a change of a light receiving position caused by the tilt of the liquid surface, a tilt angle of the liquid surface, i.e., the tilt of the device main body can be detected.

In a case where the free liquid surface is used, a followability or a stability of the free liquid surface with respect to a change in tilt of the tilt angle measuring device is affected by a viscosity of a liquid forming the free liquid surface.

That is to say, in a case where the viscosity of the liquid is decreased, the followability is improved, but the stability is lowered, a susceptibility to, a vibration, or the like is increased, and an error incidence rate is also raised. Conversely, in a case where the viscosity of the liquid is increased, the followability is lowered, and an angle detection takes time, but the stability is improved.

SUMMARY OF THE INVENTION

It is an object of the present invention to provide a tilt angle measuring device which improves a followability without increasing an error incidence rate.

To attain the object as described above, a tilt angle measuring device according to the present invention comprises a discoid container for including a liquid forming a free liquid surface, a light emitting source for allowing a detection light to enter the free liquid surface, a photodetector for receiving the detection light reflected on the free liquid surface and a signal processing unit for detecting a tilt of the free liquid surface based on a detection signal from the photodetector, wherein the signal processing unit sets a detection light storage time of the photodetector so that an error incidence rate of the detection signal is a predetermined value.

Further, the tilt angle measuring device according to the present invention further comprises a tilt pattern, wherein a tilt pattern image is projected on the free liquid surface, the photodetector receives the tilt pattern image reflected on the free liquid surface, a tilt of the free liquid surface is detected based on a displacement of the tilt pattern image, and wherein the tilt pattern has a roughness capable of recognizing the tilt pattern image when the tilt pattern image deviates due to a micro vibration of the free liquid surface.

Further, in the tilt angle measuring device according to the present invention, the container has, on a bottom portion, a groove which is formed concentrically with a center of the container and a central portion which is formed at the center of the container and is upheaved from the groove, and the liquid is stored so that the liquid fills the groove and forms a shallowest portion at the central portion.

Further, in the tilt angle measuring device according to the present invention, a plurality of flow resistance elements are provided to protrude in the groove at equal intervals, and the flow resistance elements are arranged so as to be immersed in the liquid.

Further, in the tilt angle measuring device according to the present invention, each of the flow resistance elements has an arc shape and a flat upper surface.

Furthermore, in the tilt angle measuring device according to the present invention, a ring-like flow control plate which covers the groove is provided above the flow resistance elements, a plurality of cutting-off portions are formed in an inner edge of the flow control plate at equal intervals, and the flow control plate is arranged so as to be immersed in the liquid.

According to the present invention, the tilt angle measuring device comprises a discoid container for including a liquid forming a free liquid surface, a light emitting source for allowing a detection light to enter the free liquid surface, a photodetector for receiving the detection light reflected on the free liquid surface and a signal processing unit for detecting a tilt of the free liquid surface based on a detection signal from the photodetector, wherein the signal processing unit sets a detection light storage time of the photodetector so that an error incidence rate of the detection signal is a predetermined value. As a result, an increase of an error incidence rate is suppressed while improving a followability.

Further, according to the present invention, the tilt angle measuring device further comprises a tilt pattern, wherein a tilt pattern image is projected on the free liquid surface, the photodetector receives the tilt pattern image reflected on the free liquid surface, a tilt of the free liquid surface is detected based on a displacement of the tilt pattern image, and wherein the tilt pattern has a roughness capable of recognizing the tilt pattern image when the tilt pattern image deviates due to a micro vibration of the free liquid surface. As a result, a tilt angle measurement can be performed even in a case where there is a micro vibration on the free liquid surface.

Further, according to the present invention, in the tilt angle measuring device, the container has, on a bottom portion, a groove which is formed concentrically with a center of the container and a central portion which is formed at the center of the container and is upheaved from the groove, and the liquid is stored so that the liquid fills the groove and forms a shallowest portion at the central portion. As a result, the container has a vibration suppressing function, and hence the stability of the tilt angle measuring device is improved.

Further, according to the present invention, in the tilt angle measuring device, a plurality of flow resistance elements are provided to protrude in the groove at equal intervals, and the flow resistance elements are arranged so as to be immersed in the liquid. As a result, the flow resistance elements further exert the vibration suppressing function, and hence the stability of the tilt angle measuring device is improved.

Furthermore, according to the present invention, in the tilt angle measuring device, a ring-like flow control plate which covers the groove is provided above the flow resistance elements, a plurality of cutting-off portions are formed in an inner edge of the flow control plate at equal intervals, and the flow control plate is arranged so as to be immersed in the liquid. As a result, the flow control plate further exerts the vibration suppressing function, and hence the stability of the tilt angle measuring device is improved.

BRIEF DESCRIPTION OF THE DRAWINGS

FIG. 11 is a drawing showing damping characteristics in a vibration environment in the present embodiment.

DETAILED DESCRIPTION OF THE PREFERRED EMBODIMENTS

Figure 1:
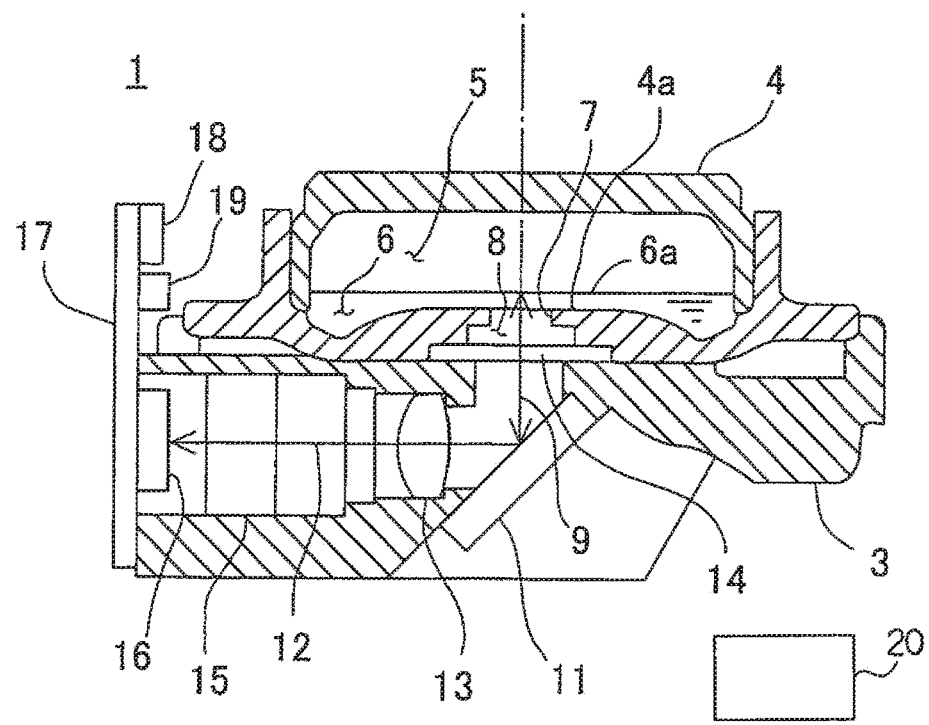
FIG. 1 is a cross-sectional view of a tilt angle measuring device according to a first embodiment of the present invention.

A description will be given below on a tilt angle measuring device according to a first embodiment of the present invention by referring to FIG. 1 to FIG. 4.

A tilt angle measuring device 1 detects a horizontality with high accuracy or detects a tilt angle from the horizontality, and is used as a tilt sensor. Further, a tilt angle which can be detected by the tilt angle measuring device 1 is, e.g., ±2° with respect to the horizontality.

A liquid-tight container 4 is provided on an upper surface of a support block 3. The container 4 forms a discoid space 5 therein, and a transparent liquid 6 with a predetermined viscosity is sealed in the space 5. As the liquid 6, a silicon oil or the like is used.

The space 5 has a volume which is sufficiently large with respect to an amount of the liquid sealed-in. In each of states where the tilt angle measuring device 1 is horizontal and where the tilt angle measuring device 1 tilts, the liquid 6 forms a free liquid surface 6a.

An optical path hole 7 for a detection light is provided in a bottom surface of the container 4. The optical path hole 7 has an axis concentric with a center line of the container 4, and a condenser lens 8 and a ¼λ plate 14 are provided in the optical path hole 7. An optical axis 9 of the condenser lens 8 coincides with the axis of the optical path hole 7.

Two optical paths orthogonal to each other are formed inside the support block 3, and the two optical paths are arranged within a plane orthogonal to the optical axis 9. A reflection mirror 11 is provided at a position of an intersection of the optical axis 9 and the plane orthogonal thereto.

Figure 3:
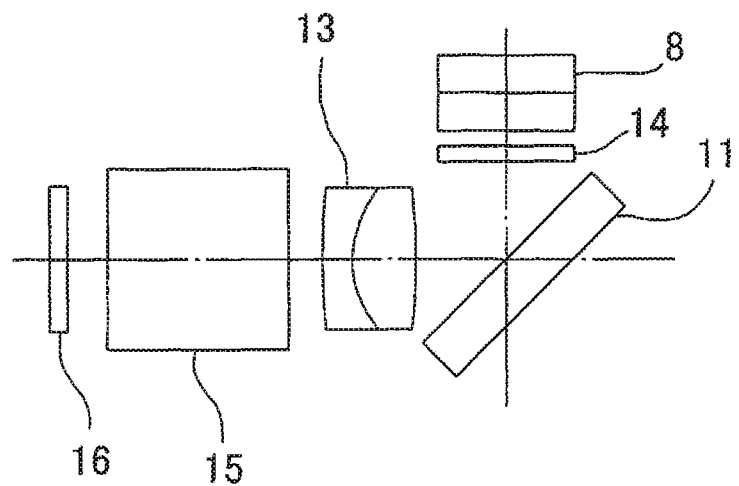
FIG. 3 is a schematic elevation diagram showing an optical system of the embodiment.

A center of one of the two optical paths is formed along a reflection optical axis 12 of the reflection mirror 11 (see FIG. 1 and FIG. 3). The condenser lens 13, a polarization beam splitter 15, and a photodetector 16 are arranged on the reflection optical axis 12 from the reflection mirror 11 side.

The polarization beam splitter 15 has a characteristic of transmitting a linearly polarized light with a predetermined polarization plane and reflecting the linearly polarized light with a polarization plane which is 90° different with respect to the linearly polarized light.

The photodetector 16 is mounted on a circuit board 17, and fixed to a side surface of the support block 3 via the circuit board 17. Further, a temperature sensor 18, an acceleration sensor 19, or the like are mounted on the circuit board 17. Further, a signal processing unit 20 is additionally provided or mounted on the circuit board 17.

As the photodetector 16, a CCD, a CMOS sensor, or the like is used, and the photodetector 16 can output a signal of a light receiving position of a detection light and further an image signal based on a signal from pixels constituting the CCD or the CMOS sensor.

The signal processing unit 20 controls a storage time of a detection light (i.e., a tilt pattern image (to be described later)) which enters the photodetector 16. Further, the signal processing unit 20 executes an image processing based on a signal from the photodetector 16, obtains a displacement of a pattern image from a reference position and detects a tilt angle.

Figure 2:
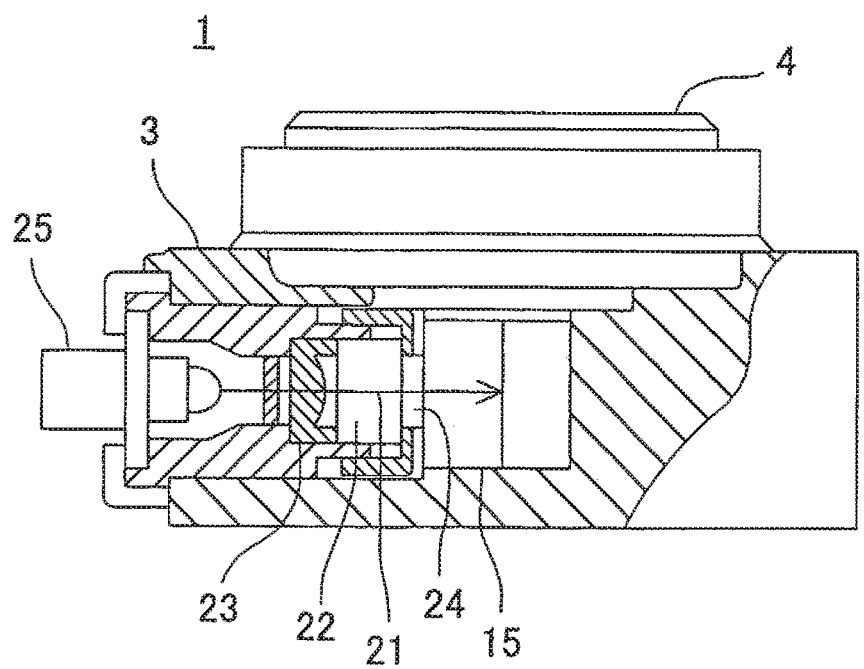
FIG. 2 is a partial cross-sectional view of the tilt angle measuring device according to the embodiment.
Figure 4:
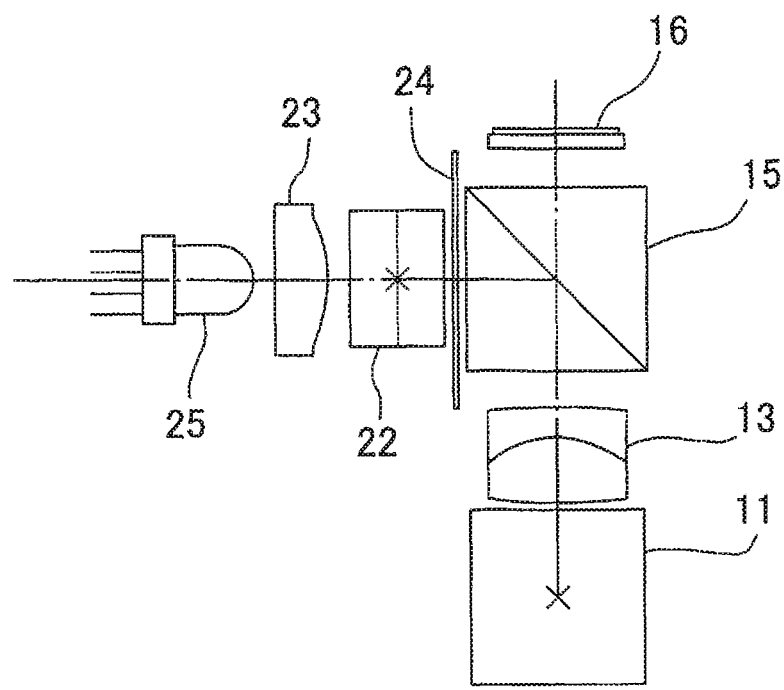
FIG. 4 is a schematic plan drawing showing the optical system of the embodiment.

The other one of the two optical paths is formed along a projection optical axis 21 (see FIG. 2 and FIG. 4). The projection optical axis 21 crosses the reflection optical axis 12, and the polarization beam splitter 15 is provided at a position where the projection optical axis 21 and the reflection optical axis 12 cross each other. Therefore, in FIG. 2, the reflection optical axis 12 extends in a vertical direction with respect to the polarization beam splitter 15 (a vertical direction with respect to a paper surface).

A polarizing plate 24, a tilt pattern 22, a collimator lens 23 and an LED light source (a light emitting source) 25 are provided on the projection optical axis 21 from the polarization beam splitter 15 side. The LED light source 25 is disposed to a side surface (a surface orthogonal to the side surface as described above) of the support block 3.

In FIG. 2, a detection light emitted from the LED light source 25 is condensed by the collimator lens 23, and transmitted through the tilt pattern 22 and the polarizing plate 24. By transmitting through the polarizing plate 24, the detection light turns to a linearly polarized light, e.g., a P linearly polarized light.

The detection light is reflected to a direction perpendicular to the paper surface by the polarization beam splitter 15, and reflected upward by the reflection mirror 11.

The detection light is transmitted through the ¼λ plate 14, then projects the tilt pattern image to the free liquid surface 6a though the condenser lens 8, and is further reflected by the free liquid surface 6a. When the tilt angle measuring device 1 tilts, since the free liquid surface 6a maintains a horizontality, the free liquid surface 6a relatively tilts with respect to the tilt angle measuring device 1.

By a tilt of the free liquid surface 6a, the detection light is reflected at an angle by double the tilt angle according to a principle of an optical lever. A reflected detection light is transmitted through the ¼λ plate 14, then reflected by the reflection mirror 11, transmitted through the condenser lens 13 and enters the polarization beam splitter 15. Since the detection light is transmitted through the ¼λ plate twice, i.e., on the forward and backward paths respectively, the reflected detection light turns to a S linearly polarized light and is transmitted through the polarization beam splitter 15.

The reflected detection light transmitted through the polarization beam splitter 15 is detected by the photodetector 16. That is to say, the tilt pattern 22 is projected onto the photodetector 16.

As described above, when the free liquid surface 6*a* tilts, the reflected detection light is received by the photodetector 16 in a state where the reflected detection light deviates from the reflection optical axis 12. By detecting a deviation of a light receiving position with reference to a position of the reflection optical axis 12, whether or not the free liquid surface 6*a* is horizontal can be detected, and further a tilt angle of the free liquid surface 6*a* can be detected.

Further, in a case where a tilt angle is detected with high accuracy, by detecting an amount of deviation based on a displacement of an image of the tilt pattern 22, it is possible to detect an angle with high accuracy.

As described above, in the tilt angle measuring device 1, when an undulation at the time of the tilt remain on the free liquid surface 6*a*, or when the free liquid surface 6*a* vibrates, an influence of the undulation or the vibration appears on a reflecting direction of the detection light, which leads to a detection error.

In the present embodiment, the undulations or the vibration is suppressed as follows.

Figure 5A:
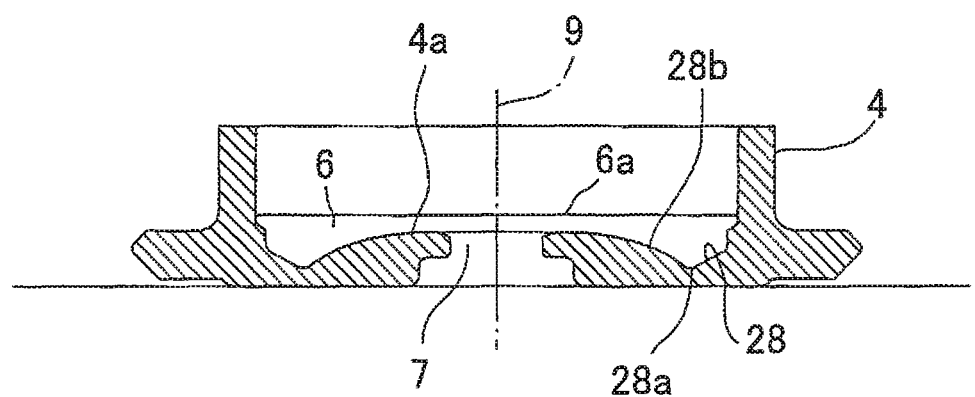
FIG. 5A is a cross-sectional view of a container of the tilt angle measuring device of the embodiment.
Figure 5B:
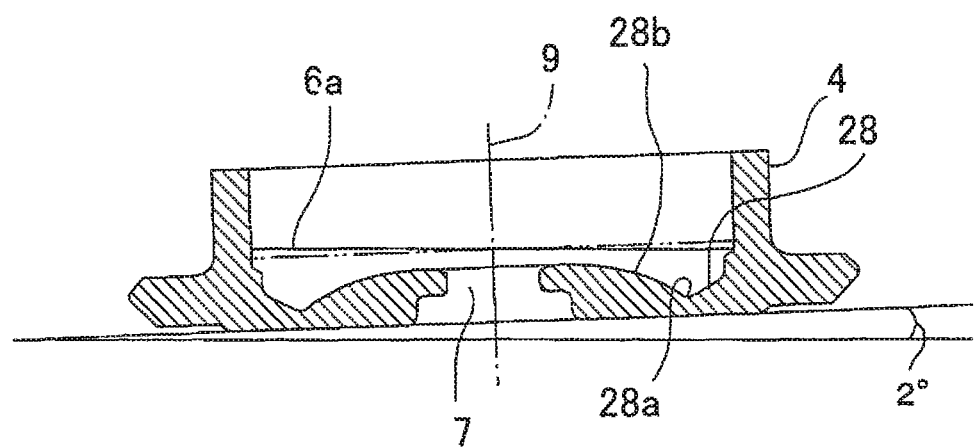
FIG. 5B is a cross-sectional view showing a state where the container tilts.

A description will be further given below on the container 4 according to the present embodiment by referring to FIG. 5A and FIG. 5B.

A ring-shaped groove 28 is formed around the optical axis 9 as the center on a bottom surface of the container 4. Further, a central portion 4*a* (including the optical path hole 7 portion) of the bottom surface of the container 4 is a flat surface orthogonal to the optical axis 9.

A cross-sectional shape of the groove 28 is designed as an approximately-V-like shape so that a central portion of the groove is a deepest portion 28*a*. A range extending from the deepest portion 28*a* to the central portion 4*a* is constituted of a curved convex surface 28*b* which gently upheaves from the deepest portion 28*a* and comes into tangent to the central portion 4*a*.

The liquid 6 stored in the container 4 has an amount which fills the groove 28 and further is a liquid depth as required (a shallowest portion) at the central portion 4*a*. Here, the liquid depth in the shallowest portion is, e.g., approximately 1 mm.

By forming the groove 28 in the container 4 and forming the central portion 4*a* upheaved from the groove 28, the liquid depth of a portion where the detection light enters the free liquid surface 6*a* can be reduced as shallow as possible.

Since the liquid depth is shallow in a reflecting portion for reflecting the detection light, a shear force due to a viscous resistance (a viscous friction) of the liquid 6 strongly acts on the free liquid surface 6*a*. Therefore, a micro vibration or the like is hardly transmitted to the free liquid surface 6*a*, and micro waves due to the vibration on the free liquid surface 6*a* are rarely generated. Further, since the liquid depth is shallow, large waves are hardly generated. Therefore, a stability in a stationary state is improved.

Next, a case where the tilt angle measuring device 1 tilts (FIG. 5B) will now be described, and the drawing shows a case where a right-side is raised.

When the tilt angle measuring device 1 tilts, the liquid 6 flows from right to left.

Since the sufficient liquid 6 is stored in the groove 28, even if a liquid depth of the central portion 4*a* is shallow, a sufficient moving amount of the liquid can be ensured.

Further, the deepest portion 28*a* is gently continuously tangent to the central portion 4*a* by the curved convex surface 28*b*, a movement of the liquid 6 is smoothly performed. Therefore, the vibration or the like of the liquid itself due to the movement of the liquid 6 is suppressed.

Further, a flow of the liquid 6 caused by tilt moves to the groove 28 on an opposite side over the central portion 4*a*. Therefore, a potential energy is consumed in a process of moving over the central portion 4*a*.

Further, when the liquid 6 traverses the shallowest portion, the liquid 6 traverses a portion having a minimum flow passage cross-sectional area, and a flow velocity increases as compared with a case where the flow passage cross-sectional area is constant. In addition to strongly receiving the viscosity resistance and the shear force from the central portion 4*a*, the increase in the flow velocity leads to an increase in viscosity resistance, and a kinetic energy of the liquid 6 is consumed.

Therefore, in a case where the flow of the liquid 6 is generated due to the tilt of the tilt angle measuring device 1, a damping force strongly acts on the liquid 6. For this reason, an undulation return or the like of the liquid is suppressed, the liquid 6 is stabilized in a short time after the tilt and it becomes possible to perform a measurement.

Figure 6:
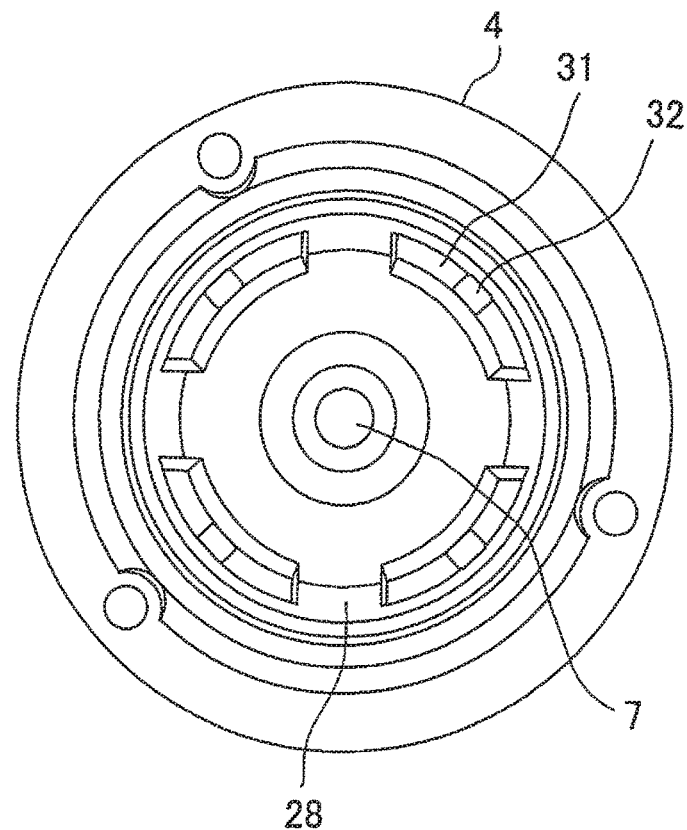
FIG. 6 is a plan view of a container of a tilt angle measuring device according to a second embodiment.
Figure 7:
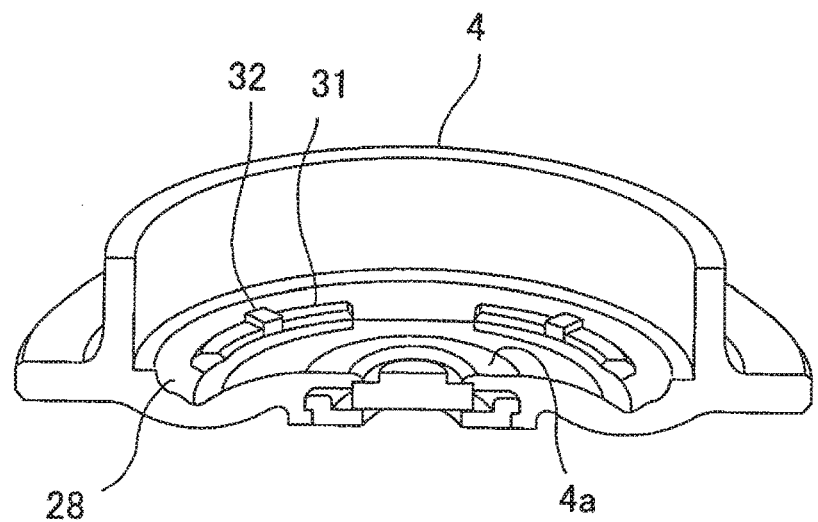
FIG. 7 is a cross-sectional perspective view of the container.

FIG. 6 and FIG. 7 show a tilt angle measuring device 1 according to a second embodiment, and show a case where flow resistance elements 31, which suppress a smooth flow of a liquid 6, is further provided in a groove 28. It is to be noted that, in FIG. 6 and FIG. 7, what are equivalent to components as shown in FIG. 1 and FIG. 2 are referred by the same symbol. By further generating a resistance against a flow of the liquid 6 by the flow resistance elements 31, a damping effect is further increased.

Each flow resistance element 31 has an arc shape concentric with the groove 28, and is provided to protrude at each of positions dividing a circumference into four. A cross-sectional shape of the flow resistance element 31 is an approximately pentagonal shape having the deepest position of the groove 28 as an apex. A protuberance 32 is formed at a center of an upper surface of the flow resistance element 31. Further, the flow resistance element 31 has such a size that the flow resistance element 31 can be completely immersed in the liquid 6.

Providing the flow resistance elements 31 in the groove 28 prevents a smooth flow of the liquid 6 in the groove 28 when a container 4 vibrates. For this reason, a formation of waves caused by the vibration of the container 4 is suppressed, undulations of the liquid 6 are also suppressed and a stability of a tilting detection by a tilt angle measuring device 1 can be improved. Further, when the container 4 tilts, the flow resistance elements 31 serve as the resistance against the flow of the liquid 6, an undulation return or the like is suppressed, the liquid 6 is stabilized in a short time after the tilt, and the measurement can be performed.

It is to be noted that the shape of each flow resistance element 31 is not restricted to the above arc shape as long as the flow resistance element 31 can give the resistance against the flow of the liquid 6. For example, columnar protuberances may be provided in the groove 28 at predetermined intervals.

Figure 8:
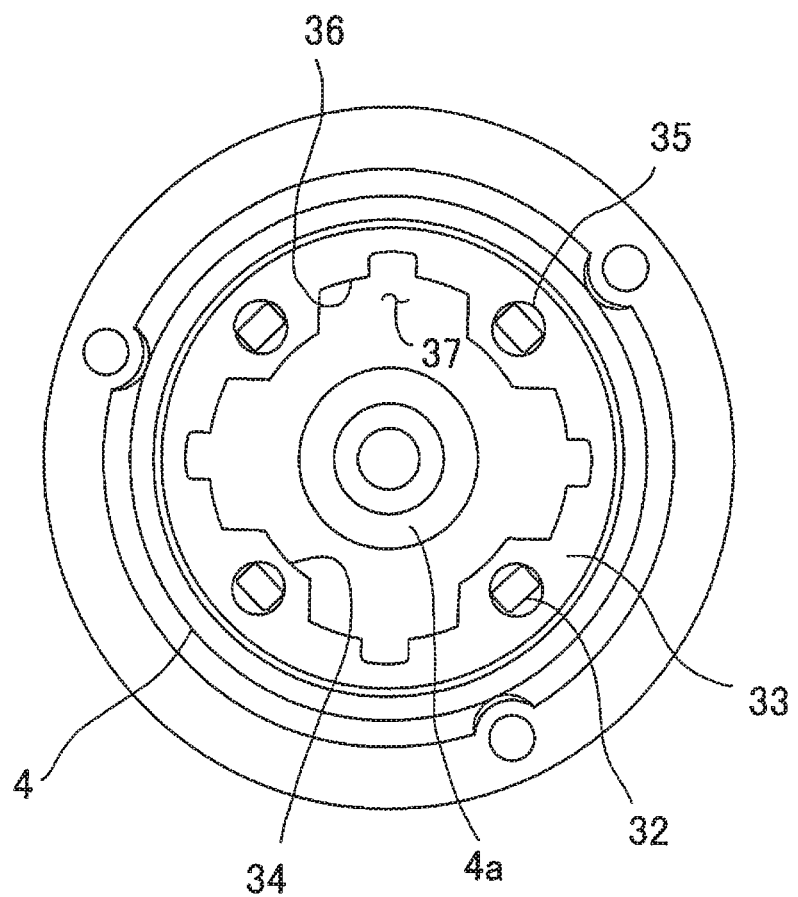
FIG. 8 is a plan view of a container of a tilt angle measuring device according to a third embodiment having a flow control plate disposed thereto.
Figure 9:
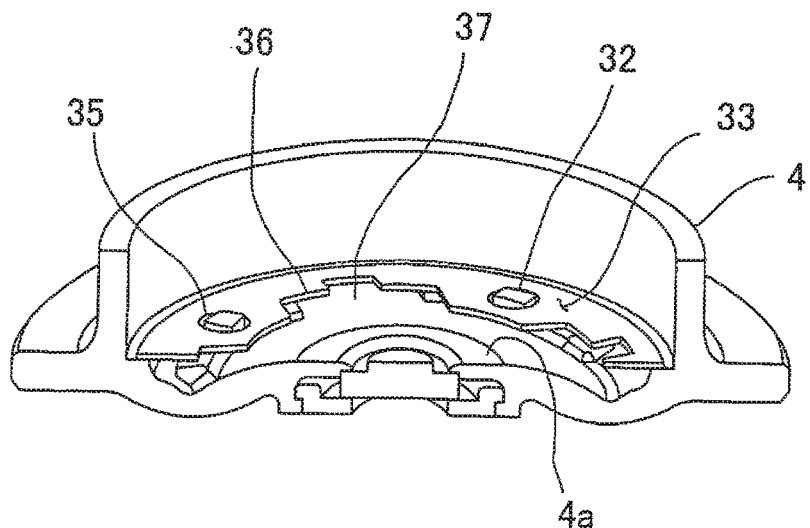
FIG. 9 is a cross-sectional perspective view of the container where the flow control plate is provided.

FIG. 8 and FIG. 9 show a tilt angle measuring device 1 according to a third embodiment and show a case where a flow control plate 33 is added. The flow control plate 33 is provided so as to cover a groove 28.

The flow control plate 33 has a circular hole 34 in a central portion, and is designed as a ring shape as an overall shape. Fitting holes 35 corresponding to protuberances 32 are provide in the flow control plate 3 at four positions (the positions equally dividing a circumference into four), and the flow control plate 33 is disposed in a state where the fitting holes 35 are fitted into the protuberances 32.

In a state where the flow control plate 33 is disposed, the flow control plate 33 is completely immersed in a liquid 6. Further, even in a state where the it angle measuring device 1 tilts, the flow control plate 33 is adapted not to be exposed.

In the flow control plate 33, a cutting-off portion 36 of a convex shape with a small projection is formed between the fitting holes 35 and 35 (the positions equally dividing a circumference into four) from an inner edge side, respectively. In a state where the flow control plate 33 is disposed, the cutting-off portion 36 forms a gap 37, into or from which the liquid 6 flows, between the cutting-off portion 36 and a central portion 4a.

When the flow control plate 33 is provided, a liquid shallow portion is formed all over an inside of a container 4, and the waves are prevented from being generated on a surface of the liquid 6. Further, in a case where the tilt angle measuring device 1 tilts, since the liquid 6 flows through the gap 37, the flow resistance is large, and a damping effect is exerted. It is to be noted that the flow control plate 33 itself has the damping effect, thus the flow resistance elements 31 may be omitted, and the flow control plate 33 alone may be provided.

Figure 10:
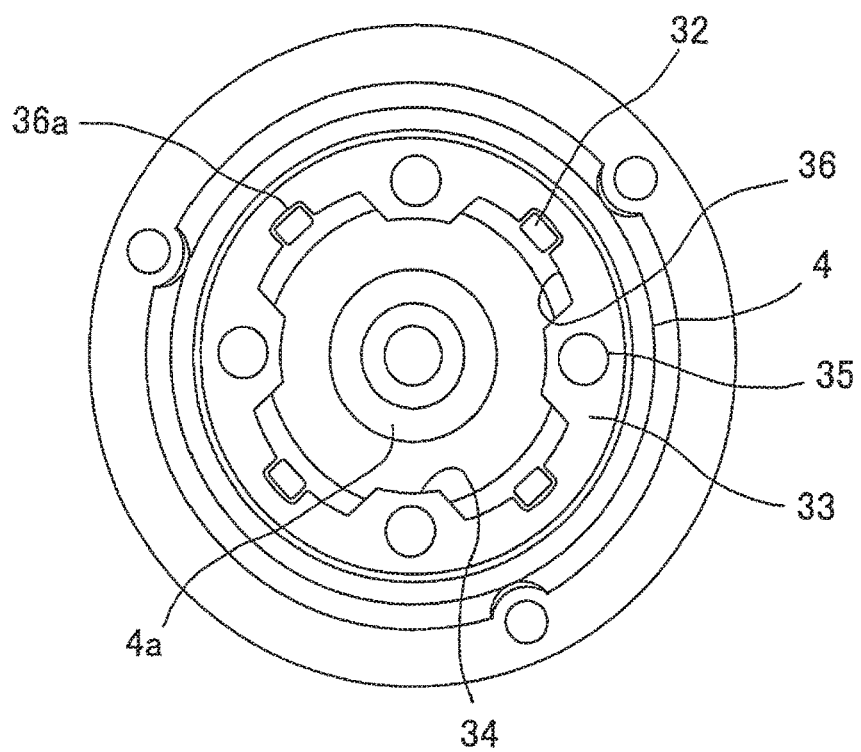
FIG. 10 is a plan view of the container according to a variation example of the third embodiment where the flow control plate is provided.

FIG. 10 shows a variation example of the third embodiment in which a disposed state of a flow control plate 33 is changed.

In the variation example, small projections 36a of cutting-off portions 36 formed in the flow control plate 33 are capable of fitting into protuberances 32, and the flow control plate 33 is provided in rotating at a necessary angle (45° in the drawing) with respect to the third embodiment.

When the small projections 36a are fitted into the protuberances 32, flow resistance elements 31 are positioned at the positions of the cutting-off portions 36, and a substantial aperture area of a gap 37 is reduced. Therefore, the flow resistance further increases, and the damping effect also increases. Further, since fitting holes 35 are fully opened and a liquid 6 flows into or from the fitting holes 35, the inflow/outflow is dispersed, and a flow state of the liquid 6 is averaged.

As described above, in the present embodiment, since the damping effect is considerable, the liquid 6 with a low viscosity can be used. Using the liquid 6 with the low viscosity leads to an improvement in followability, and a working efficiency of a leveling operation in a measurement apparatus using the tilt angle measuring device 1 can be improved.

A viscosity of a liquid 6 used in a conventional tilt sensors is 100 cSt but, in the present embodiment, a liquid 6 with a viscosity of 50 cSt can be used.

Furthermore, since the liquid 6 with the low viscosity can be used, an efficient use in a cold region of a high latitude becomes possible.

FIG. 11 shows an error incidence rate of a tilt detection signal under a vibration environment. The tilt detection signal is a photodetection signal output from the photodetector 16. In FIG. 11, each storage time represents a time for which the photodetector 16 is receiving the detection light (an exposure time).

A first example shows an error incidence rate in a tilt angle measuring device according to a second embodiment as shown in FIG. 8 and FIG. 9, and a second example shows an error incidence rate in a tilt angle measuring device according to a third embodiment as shown in FIG. 10. Further, a third example shows an error incidence rate of a conventional tilt angle measuring device.

It is to be noted that FIG. 11 shows a case where a silicon oil of 50 cSt is used in the first example and the second example and a silicon oil of 100 cSt is used in a conventional tilt sensor.

As shown in FIG. 11, in the conventional tilt sensor, a storage time is set to 30 ms from a damping state of the liquid 6 (the viscosity: 100 cSt), and the error incidence rate is 27% at this storage time under a vibration environment.

On the other hand, although the viscosity of the liquid 6 is decreased to 50 cSt, in the first example and the second example, the error incidence rates are 25% and 24% under the vibration environment at the storage time 42 ms. If the storage time is 40 ms or less, the first example and the second example have the error incidence rates lower than the error incident rate of the conventional tilt sensor and can produce excellent results against the vibration.

Further, based on a relationship between the storage time and the error incidence rate in the first example and the second example, when the storage time is shortened, the error incidence rate is lowered in correspondence with the storage time. In particular, when the storage time is 2 ms, the error incidence rates are 6% and 3% respectively, and the error incidence rates are greatly lowered in comparison with the conventional tilt sensor. Further, even if the storage time is 2 mn, it has been also confirmed that the tilt angle measurement is possible.

Therefore, the viscosity of the liquid 6 can be lowered, and a high responsiveness of a tilt angle measuring device 1 can be obtained even under a low-temperature environment. As the viscosity of the liquid used for obtaining the high responsiveness, 40 to 60 cSt is preferred.

Next, a description will be given on a tilt pattern by referring to FIG. 12A and FIG. 12B.

Figure 12A:
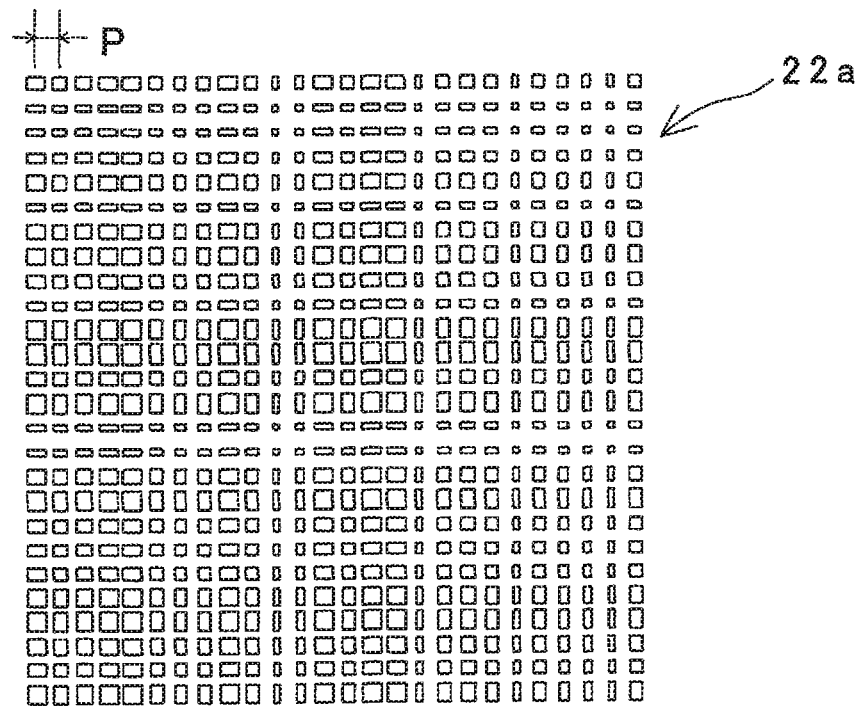
FIG. 12A and FIG. 12B are drawings showing an example of a tilt pattern respectively.
Figure 12B:
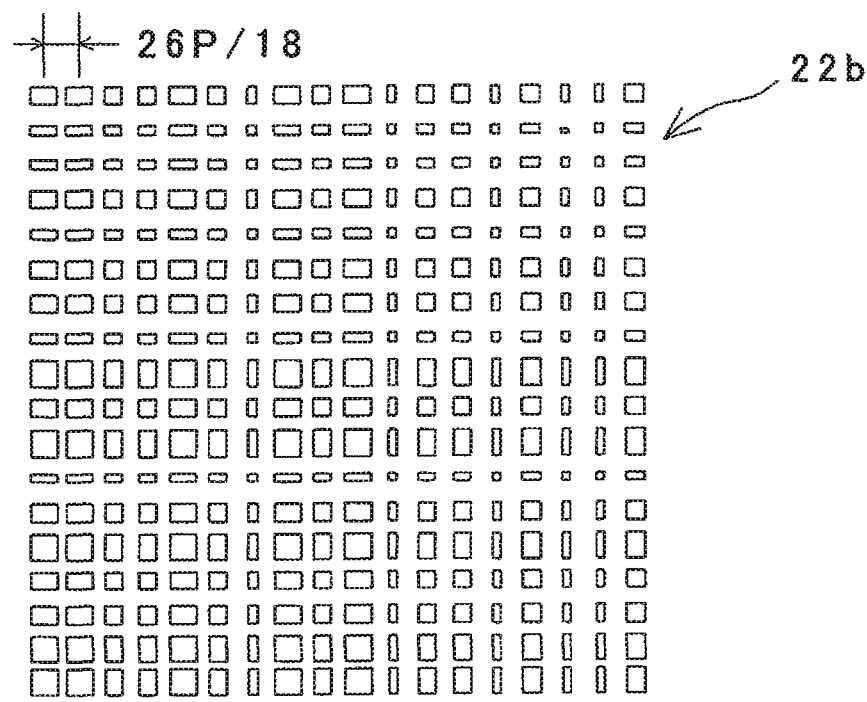

FIG. 12A shows a tilt pattern 22a as an example of the tilt pattern, and FIG. 12B shows a tilt pattern 22b as another example.

The tilt pattern 22a and the tilt pattern 22b are basically the same pattern, and in the patterns, rows and columns are formed at equal intervals at a predetermined pitch. A rectangular pattern element is arranged at each intersection in a matrix, and the pattern element gradually changes its shape in a row direction and a column direction. The tilt pattern 22b and the tilt pattern 22a have same outer shapes (the same size), and the tilt pattern 22b has a larger pitch with respect to the tilt pattern 22a.

For example, in the drawing, the pitch of the tilt pattern 22b is 26/18 with respect to the pitch of the tilt pattern 22a.

A selection of either the tilt pattern 22a or the tilt pattern 22b is determined in correspondence with an environment where a tilt angle measuring device 1 is used and in correspondence with a viscosity of a liquid 6 to be used.

For example, in a case where the tilt angle measuring device 1 is used under an environment where the high responsiveness is not required and the vibration is low, or in a case where the liquid 6 with the high viscosity is used, it is considered that undulations of a liquid surface with respect to a micro vibration (the vibration which cannot be felt by humans) are small. In this case, a deviation of a pattern image acquired during the storage time is considered to be small, and the tilt pattern 22a is used.

Although the tilt pattern 22a is a precise pattern, since a deviation of a pattern image is small, the pattern image can be recognized, and the tilt angle measurement can be performed. Further, since the tilt pattern 22a is the precise pattern, an image with a high resolution can be acquired.

Further, in a case where a high responsiveness is required under an environment and further in a case where the liquid 6 with the low viscosity is used in correspondence with the high responsiveness, it is considered that the liquid surface also finely undulates with respect to the micro vibration.

In this case, the tilt pattern 22b is used. In the tilt pattern 22b, since increasing (roughening) the pitch of the pattern can prevent the pattern elements adjacent to each other from overlapping even if the pattern elements are finely displaced, the pattern elements adjacent to each other can be discriminated, and the entire pattern can be recognized.

Therefore, an image processing enables calculating a displacement amount of the entire pattern, and a tilt angle can be measured.

Therefore, when the storage time of the pattern image is set to a short time (e.g., 2 ms), the liquid 6 with the low viscosity is selected, and the tilt pattern 22b is selected as the tilt pattern, the tilt angle measuring device 1 with the high responsiveness and the small error incidence rate can be constituted.

Further, the tilt pattern 22a is not restricted to the above-described roughness. The tilt pattern 22a suffices to recognize a pattern image with respect to a deviation of the pattern image against a micro vibration of the liquid surface. Further, the pattern is not restricted to a matrix shape and suffices to be a vertically or horizontally symmetrical shape.

Further, in correspondence with a use environment, the storage time may be selected by a signal processing unit 20 based on an operating temperature obtained by a temperature sensor 18. That is to say, considering a change in viscosity of the liquid 6 due to a temperature, the data of the storage time and the error incidence rate is acquired in advance, and the storage time is set so that the error incidence rate can satisfy a measurement accuracy required in a presumed use environment.

Furthermore, as described above, when a groove 28 is formed in a container 4, flow resistance elements 31 are provided in the groove 28, and further a flow control plate 33 is provided, or the like, thereby a vibration control function and a vibration damping function for the liquid 6 are added to the container 4, and the tilt angle measuring device can be constituted with the high responsiveness and the high stability.

The invention claimed is:

1. A tilt angle measuring device comprising; a discoid container for including a liquid forming a free liquid surface, a light emitting source for allowing a detection light to enter said free liquid surface, a photodetector for receiving the detection light reflected on said free liquid surface and a signal processing unit for detecting a tilt of said free liquid surface based on a detection signal from said photodetector, wherein said signal processing unit sets a detection light storage time of said photodetector so that an error incidence rate of the detection signal is a predetermined value.

2. The tilt angle measuring device according to claim 1, further comprising a tilt pattern, wherein a tilt pattern image is projected on said free liquid surface, said photodetector receives said tilt pattern image reflected on said free liquid surface, a tilt of said free liquid surface is detected based on a displacement of said tilt pattern image, and wherein said tilt pattern has a roughness capable of recognizing said tilt pattern image when said tilt pattern image deviates due to a micro vibration of said free liquid surface.

3. The tilt angle measuring device according to claim 1, wherein said container has, on a bottom portion, a groove which is formed concentrically with a center of said container and a central portion which is formed at the center of said container and is upheaved from said groove, and said liquid is stored so that said liquid fills said groove and forms a shallowest portion at said central portion.

4. The tilt angle measuring device according to claim 3, wherein a plurality of flow resistance elements are provided to protrude in said groove at equal intervals, and said flow resistance elements are arranged so as to be immersed in said liquid.

5. The tilt angle measuring device according to claim 4, wherein each of said flow resistance elements has an arc shape and a flat upper surface.

6. The tilt angle measuring device according to claim 4, wherein a ring-like flow control plate which covers said groove is provided above said flow resistance elements, a plurality of cutting-off portions are formed in an inner edge of said flow control plate at equal intervals, and said flow control plate is arranged so as to be immersed in said liquid.

7. The tilt angle measuring device according to claim 5, wherein a ring-like flow control plate which covers said groove is provided above said flow resistance elements, a plurality of cutting-off portions are formed in an inner edge of said flow control plate at equal intervals, and said flow control plate is arranged so as to be immersed in said liquid.

* * * * *